US011677758B2

(12) United States Patent
Rasmussen et al.

(10) Patent No.: US 11,677,758 B2
(45) Date of Patent: Jun. 13, 2023

(54) MINIMIZING DATA FLOW BETWEEN COMPUTING INFRASTRUCTURES FOR EMAIL SECURITY

(71) Applicant: Cisco Technology, Inc., San Jose, CA (US)

(72) Inventors: Jason Peter Rasmussen, Calgary (CA); Adam Joseph O'Donnell, San Francisco, CA (US); Usman Amir Din, Markham (CA)

(73) Assignee: Cisco Technology, Inc., San Jose, CA (US)

(*) Notice: Subject to any disclaimer, the term of this patent is extended or adjusted under 35 U.S.C. 154(b) by 13 days.

(21) Appl. No.: 16/867,350

(22) Filed: May 5, 2020

(65) Prior Publication Data

US 2021/0281586 A1    Sep. 9, 2021

Related U.S. Application Data

(60) Provisional application No. 62/985,064, filed on Mar. 4, 2020.

(51) Int. Cl.
*H04L 9/40*           (2022.01)
*H04L 51/08*          (2022.01)
(Continued)

(52) U.S. Cl.
CPC .......... *H04L 63/1416* (2013.01); *H04L 51/08* (2013.01); *H04L 51/42* (2022.05); *H04L 63/20* (2013.01); *H04L 67/306* (2013.01)

(58) Field of Classification Search
CPC ..... H04L 63/1416; H04L 51/08; H04L 51/22; H04L 63/20; H04L 67/306; H04L 51/42
(Continued)

(56) References Cited

U.S. PATENT DOCUMENTS 6,901,519 B1 * 5/2005 Stewart ................. H04L 63/145
                                                       709/206
10,601,865 B1 * 3/2020 Mesdaq .................. H04L 51/12
(Continued)

OTHER PUBLICATIONS

The PCT Search Report and Written Opinion dated Apr. 28, 2021 for PCT application No. PCT/US21/20530, 16 pages.

*Primary Examiner* — Kaylee J Huang
(74) *Attorney, Agent, or Firm* — Lee & Hayes, P.C.

(57) ABSTRACT

Techniques for minimizing data flow from a first computing infrastructure hosting an email service platform to a second computing infrastructure at least partly hosting an email security platform that provides security analysis on emails of the email service. The email security platform may extract metadata from emails received at the first computing infrastructure, and send that metadata to the second computing infrastructure that is hosting a back end of the email service platform. The metadata extracted from the emails may include less confidential contained in an email, but enough information for the email security platform to determine whether an email is potentially malicious. Thus, the security analysis performed on emails to detect malicious attacks may be offloaded to the second computing infrastructure, but the metadata that leaves the first computing infrastructure and flows to the second computing infrastructure may be minimized by extracting meaningful metadata.

20 Claims, 7 Drawing Sheets

(51) Int. Cl.
*H04L 67/306* (2022.01)
*H04L 51/42* (2022.01)

(58) Field of Classification Search
USPC .................... 726/23; 709/206, 217, 203, 219
See application file for complete search history.

(56) References Cited

U.S. PATENT DOCUMENTS

| | | | | |
|---|---|---|---|---|
| 10,911,489 | B1* | 2/2021 | Chechik | H04L 63/1483 |
| 2003/0200272 | A1* | 10/2003 | Campise | H04L 51/28 |
| | | | | 709/206 |
| 2004/0111480 | A1* | 6/2004 | Yue | H04L 63/101 |
| | | | | 709/206 |
| 2005/0193429 | A1* | 9/2005 | Demopoulos | H04L 63/1408 |
| | | | | 726/23 |
| 2007/0204043 | A1* | 8/2007 | Espinosa | H04L 51/12 |
| | | | | 709/225 |
| 2010/0011079 | A1* | 1/2010 | Hitchcock | H04L 51/046 |
| | | | | 709/206 |
| 2010/0251372 | A1* | 9/2010 | Luck | G06F 21/56 |
| | | | | 726/24 |
| 2013/0333026 | A1* | 12/2013 | Starink | G06F 16/9558 |
| | | | | 726/22 |
| 2015/0007312 | A1* | 1/2015 | Pidathala | H04L 63/1433 |
| | | | | 726/22 |
| 2015/0096023 | A1 | 4/2015 | Mesdaq et al. | |
| 2016/0080300 | A1* | 3/2016 | Eikenberry | H04L 51/00 |
| | | | | 709/206 |
| 2017/0048273 | A1* | 2/2017 | Bach | H04L 51/12 |
| 2017/0093768 | A1* | 3/2017 | Gatti | H04L 51/12 |
| 2018/0007061 | A1 | 1/2018 | Liebmann et al. | |
| 2019/0173921 | A1 | 6/2019 | DiCorpo et al. | |
| 2019/0268373 | A1* | 8/2019 | Celik | G06K 9/00483 |
| 2019/0349400 | A1* | 11/2019 | Bruss | G06F 21/568 |
| 2020/0396258 | A1* | 12/2020 | Jeyakumar | G06N 20/20 |
| 2021/0266345 | A1* | 8/2021 | Chen | G06N 20/00 |

\* cited by examiner

MINIMIZING DATA FLOW BETWEEN COMPUTING INFRASTRUCTURES FOR EMAIL SECURITY

RELATED APPLICATIONS

This application claims priority to U.S. Provisional Patent Application No. 62/985,064, filed on Mar. 4, 2020, the entire contents of which are incorporated herein by reference.

TECHNICAL FIELD

The present disclosure relates generally to implementing email security platforms across separate computing infrastructures, and minimizing data flow between the computing infrastructures to implement the email security platforms.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, hackers and other malicious entities use email as a primary channel for delivering malware and malware-less attacks against users. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, email service providers may be unable to progress at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
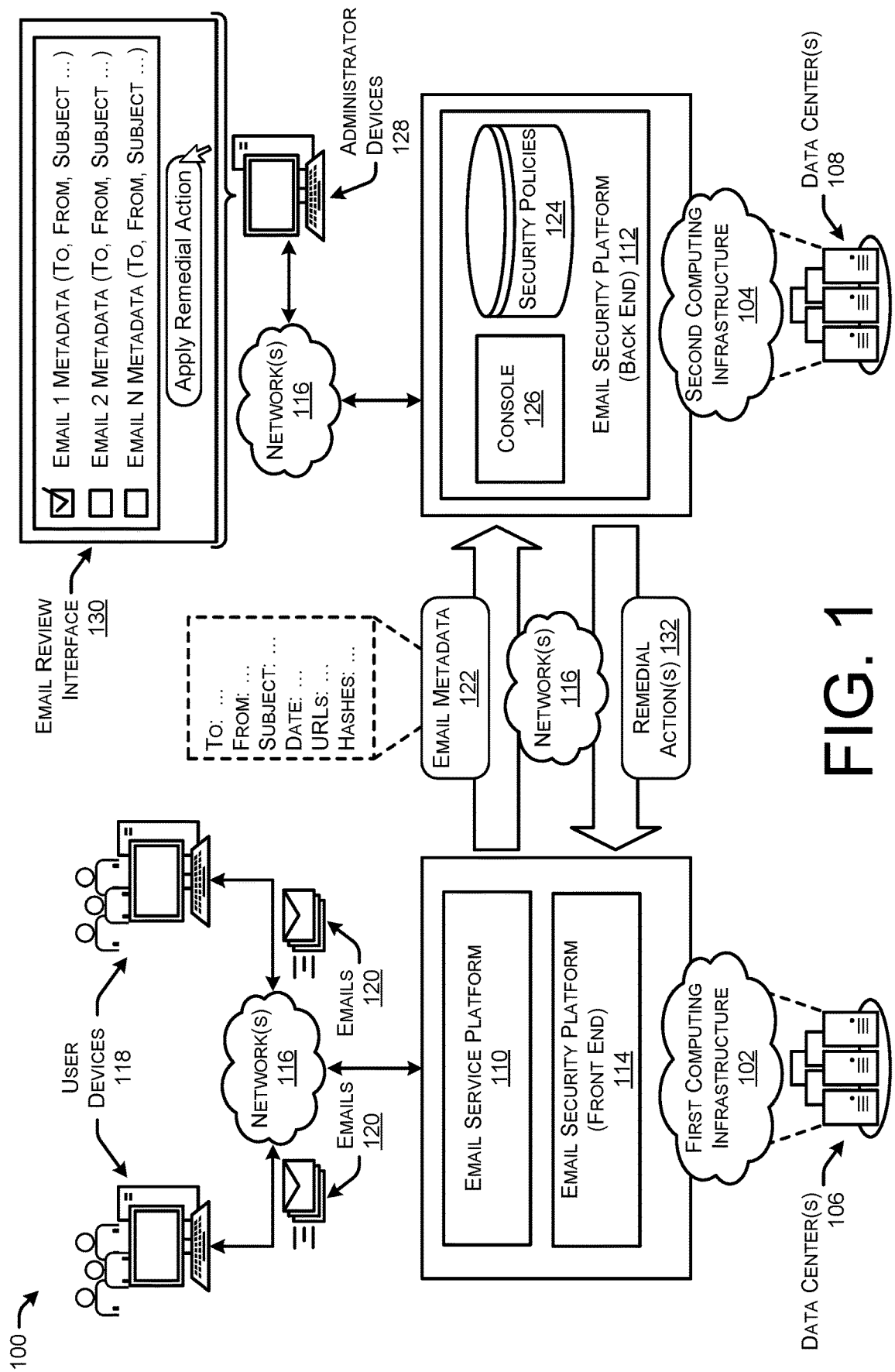
FIG. 1 illustrates a system-architecture diagram of an example distributed computing architecture that includes a first computing architecture that is hosting an email service platform, and a second computing architecture that is hosting an email security platform. The computing infrastructures communicate data between each other to implement security analysis on emails of the email service.

This disclosure describes techniques for minimizing data flow from a first computing infrastructure hosting an email service to a second computing infrastructure at least partly hosting an email security platform that provides security analysis on emails of the email service. A method to perform the techniques described herein includes obtaining, at the first computing infrastructure, an email for a user account registered with an email service, the first computing infrastructure hosting the email service. Further, the method includes extracting, at the first computing infrastructure, metadata from the email and sending the metadata from the first computing infrastructure and to the second computing infrastructure that is hosting an email security platform. Additionally, the method includes evaluating, by the email security platform, the metadata against a security policy, the security policy defining malicious characteristics of emails. The method may further include generating result data indicating a result of evaluating the metadata against the security policy.

Additionally, the techniques described herein may be performed by a system and/or device having non-transitory computer-readable media storing computer-executable instructions that, when executed by one or more processors, performs the method described above.

Example Embodiments

This disclosure describes techniques for minimizing data flow from a first computing infrastructure hosting an email service to a second computing infrastructure at least partly hosting an email security platform that provides security analysis on emails of the email service. Traditionally, email service providers may attempt to provide security analysis of emails for users of their email service. However, the security analysis preformed by email service providers suffer from various inefficiencies, such as being unable to stay current on the newest attacks on email communications, lacking the amount of computing resources necessary to perform the security analysis, lacking availability of tools for performing the security analysis, and so forth.

According to the techniques described herein, an email security platform may extract metadata from emails received at the first computing infrastructure that is hosting the email service platform, and send that metadata across one or more networks to the second computing infrastructure that is hosting a back end of the email service platform. The metadata extracted from the emails may include data in an email that is considered less confidential or private, but enough information for the email security platform to make a decision as to whether an email is potentially malicious. In this way, the security analysis performed on emails to detect malicious attacks may be offloaded to the second computing infrastructure, but the metadata that leaves the first computing infrastructure and flows to the second computing infrastructure may be minimized by extracting only meaningful metadata, and by refraining from sending private or confidential content of the email. In this way, data flow between the multiple computing infrastructures is minimized, privacy concerns around confidential data leaving the first computing infrastructure are addressed, and resource-intensive processing techniques are offloaded to the second computing infrastructure to be performed by an email security platform. As described herein, the term "malicious" may be applied to data, actions, attackers, entities, emails, etc., and the term "malicious" may generally correspond to spam, phishing, spoofing, malware, viruses, and/or any other type of data, entities, or actions that may be considered or viewed as unwanted, negative, harmful, etc., for a recipient and/or destination email address associated with an email communication.

To implement the techniques described herein, the email service platform and the email security platform may work in unison as a multi-computing infrastructure. The email service platform may receive emails that are to be communicated to users of the email service, such as being stored at a location that is accessible to the users via their respective inboxes. As part of the intake process for emails, the email service platform may determine whether a destination email address is registered for use of the email security platform. If the destination email address for the email is registered for use of the email security platform, the email service platform may send the email to a front end of the email security platform running on the first computing infrastructure.

After receiving an email for a user registered for use of the email security platform, the front end may classify and extract meaningful metadata from the email while the email is maintained in the first computing infrastructure. Meaningful metadata may include, for example, indications of a "To" address for the email, a "From" address for the email, a "Subject" of the email, a Date/Time the email was communicated, hashes of attachments to the email, URLs in the body of the email, and so forth. The metadata may generally exclude content included in the body of the email, actual attachments to the email, and/or other data of the email that may be private or confidential. Further, the metadata extracted from the email may generally be probative information, or at least sufficient information, for the email security platform to determine whether an email is potentially malicious.

After extracting the metadata, the front end of the email security platform may transmit the metadata from the first computing infrastructure to the second computing infrastructure. By sending metadata that may be considered less private or sensitive as compared to content that is not sent to the second computing infrastructure, privacy concerns around the emails are addressed, and the amount of data sent between computing infrastructures is minimized. The email security platform that is running on the second computing infrastructure may perform various security analysis techniques for determining whether the metadata of the email indicates that the email is malicious or safe. For instance, the email security platform may determine that the email was sent from an email address associated with a malicious domain, the Subject includes words commonly associated with phishing, spam, and/or spoofing attacks, URLs included in the email are to malicious websites, hashes of attachments correspond to malware attacks, and so forth.

The email security platform may index the metadata associated with the emails, and may additionally provide a result of the security analysis for the email (e.g., potentially malicious, safe, unknown, etc.) along with the metadata for the emails. The email security platform may maintain a reporting datastore in the second computing infrastructure that stores the metadata and results of the security analysis. The reporting datastore may be accessible to users of the email security platform via a console (or other access means) through which the user can view and/or take actions on potentially malicious emails. For instance, the users may view, search, review, and/or request that the email security platform take an action on an email (e.g., quarantine, delete, flag, etc.). In this way, users are able to gain additional insights around the emails being communicated in their personal inbox and/or organization being monitored by, for example, an administrator. Upon determining that an action is to be taken on an email, the email security platform may provide an indication of the remedial action to the email service platform, which may in turn take that action on one or more emails (e.g., quarantine, delete, etc.).

The techniques described herein improve the functioning of email service platforms as well as email security platforms. For instance, rather than performing security analysis on the first computing infrastructure, large amounts of processing may be offloaded to a second computing infrastructure to help with computing-resource overhead at the first computing infrastructure. In addition to reducing processing load at the first computing infrastructure, the second computing infrastructure may have additional tools or resources that enable more effective and efficient security analysis of the emails. As a specific example, the first computing infrastructure may be a private enterprise network hosting an email service platform, and the second computing infrastructure may comprise a public cloud infrastructure with a large toolbox, or large amounts of options, for performing security analysis on emails.

Additionally, the techniques described herein not only improve the ability to perform security analysis on emails, but the techniques also reduce the amount of data that is sent between the multiple computing infrastructures to perform security analysis. For instance, meaningful metadata may be extracted that is probative to whether an email is malicious or not, but private or sensitive information that users may not want to leave the first computing infrastructure may not be extracted or sent to the second computing infrastructure.

By only extracting meaningful metadata, privacy concerns are addressed and the amount of data communicated between computing infrastructures is minimized, thereby reducing the amount of bandwidth required. In some instances, the first computing infrastructure may be located in a first jurisdictional region (e.g., country, municipal, union, etc.) and the second computing infrastructure may be located in a second jurisdictional region different than the first jurisdictional region. In some instances, the types of email metadata sent across the jurisdictional boundaries may be limited or restricted based on different laws or regulations for those jurisdictions. For instance, various rules or regulations of the different jurisdictions may allow or restrict different data from being communicated in and out to protect privacy concerns. Accordingly, private data in emails may not be allowed to leave the first computing infrastructure to the second computing infrastructure in such examples.

Although the operations for extracting metadata from emails are described as being performed by a front-end of the email security platform running in the first computing infrastructure, the techniques may equally be performed by components of the email service platform itself. That is, the first computing infrastructure may not host any components of the email security platform, and may provide the metadata to the email security platform running on the second computing infrastructure.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example distributed computing architecture that includes a first computing architecture 102 that is hosting an email service platform, and a second computing architecture 104 that is hosting an email security platform. The computing infrastructures communicate data between each other to implement security analysis on emails of the email service.

Generally, the first computing infrastructure 102 and the second computing infrastructure 104 may include devices housed or located in one or more data centers 106 and 108, respectively, that may be located at different physical locations. For instance, the first computing infrastructure 102 and the second computing infrastructure 104 may be supported by networks of devices in a public cloud computing platform, a private/enterprise computing platform, and/or any combination thereof. The one or more data centers 106 and 108 may be physical facilities or buildings located across geographic areas that designated to store networked devices that are part of the first computing infrastructure 102 and the second computing infrastructure 104. The data centers 106 and 108 may include various networking devices, as well as redundant or backup components and infrastructure for power supply, data communications connections, environmental controls, and various security devices. In some examples, the data centers 106 and 108 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the first computing infrastructure 102 and the second computing infrastructure 104 may not be located in explicitly defined data centers 106 and 108, but may be located in other locations or buildings.

Generally, the first computing infrastructure 102 and the second computing infrastructure 104 may each correspond to different resource domains or pools that are owned and/or operated by different entities. For instance, the first computing infrastructure 102 may be a private enterprise network that is owned and operated by a company or other organization, and the second computing infrastructure 104 may be a public cloud infrastructure (or another enterprise infrastructure) owned and/or operated by another entity. In some instances, the first computing infrastructure 102 may generally have a higher level of trust with users or clients than the second computing infrastructure 104 at least because the first computing infrastructure 102 is hosting the email service platform 110.

The email service platform 110 may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services in the first computing infrastructure 102 (e.g., cloud infrastructure). However, the email service platform 110 may generally comprise any type of platform for managing the communication of email communications between clients or users. The email service platform 110 may generally comprise a delivery engine behind email communications, and include the requisite software and hardware for delivering email communications between users. For instance, an entity may operate and maintain the software and/or hardware of the email service platform 110 to allow users to send and receive emails, store and review emails in inboxes, manage and segment contact lists, build email templates, manage and modify inboxes and folders, scheduling, and/or any other operations performed using email service platforms 110.

The second computing infrastructure 104 may be hosting an email security platform back end 112 (or "back end 112") that provides security analysis for emails communicated by the email service platform 110. As noted above, the second computing infrastructure 104 may comprise a different domain and/or pool of resources used to host the email security platform 112. The second computing infrastructure 104 may be owned and/or operated by a different entity than that which owns or operates the first computing infrastructure 102. In some instances, the first and second computing infrastructures 102 and 104 may work together, such as by forming an agreement, contract, etc., such that an email security platform front end 114 (or simply "front end 114") is running or executing on the first computing infrastructure 102. The front end 114 may generally comprise software components or resources that are running on the first computing infrastructure 102 to perform pre-processing operations on email communications, such as by extracting metadata that is to be provided to the back end 112.

As illustrated, the email service platform 116 may provide one or more email services to users of user device 118 to enable the user devices 118 to communicate emails 120 over one or more networks 116, such as the Internet. However, the network(s) 116 may generally comprise one or more networks implemented by any viable communication technology, such as wired and/or wireless modalities and/or technologies. The network(s) 116 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 116 may include devices, virtual resources, or other nodes that relay packets from one device to another.

The user devices 118 may generally comprise any type of electronic device capable of communicating using email communications. For instance, the user devices 118 may include one or more of personal user devices (e.g., desktop computers, laptop computers, phones, tablets, wearable devices, entertainment devices such as televisions, etc.), network devices (e.g., servers, routers, switches, access points, etc.), and/or any other type of computing device. Thus, the user devices 118 may utilize the email service platform 110 to communicate using emails 120 based on email address domain name systems according to techniques known in the art.

The email service platform 110 may receive emails 120 that are destined for user devices 118 that have access to inboxes associated with destination email addresses managed by, or provided by, the email service platform 110. That is, emails 120 are communicated over the network(s) 116 to one or more recipient servers of the email service platform 110, and the email service platform 110 determines which registered user the email 120 is intended for based on email information such as "To," "Cc," Bcc," and the like. In instances where users of the user device 118 have registered for use of the email security platform 112, an organization managing the user devices 118 has registered for use of the email security platform 112, and/or the email service platform 110 itself has registered for use of the email security platform 112, the email service platform 110 may provide the appropriate emails 120 to the front end 114 for pre-preprocessing of the security analysis process.

Generally, the front end 114 may perform at least metadata extraction techniques on the emails 120, and may further perform content pre-classification techniques on the emails 120 in some instances. The types of metadata that may be scanned for, and extracted by, the front end 114 includes indications of the "To" email address(es), the "From" email address(es), the "Subject" of the emails 120, the Date/Time associated with communication of the emails 120, indications of universal resource locators (URLs) or other links in the emails 120, hashes of attachments, fuzzy hashes extracted from the message body of the emails 120, etc. Importantly, the front end 114 may refrain from scanning and/or extracting data from the email 120 that is private, sensitive, confidential, etc. in the emails. For instance, the front end 114 may refrain from scanning or extracting from the body of the emails 120, any attachments to the emails 120, and/or other information considered private. Generally, the email service platform 110 and/or users of the email security platform 112 may define what information is permitted to be scanned and/or extracted from the emails 120, and what information is too private or confidential and is not permitted to be scanned and/or extracted from the emails 120.

Upon extracting metadata from the emails 120 that is to be used for security analysis, the front end 114 may send the email metadata 122 over the network(s) 116 to the second computing infrastructure. Because this email metadata 122 is leaving the boundaries of the first computing infrastructure, private email data may not be sent to the second computing infrastructure and may instead be kept within the first computing infrastructure 102. As noted above, rather than having a front end 114 running in the first computing infrastructure 102, the email service platform 110 itself may be configured to scan and extract the email metadata 122, as well as send the email metadata 122 to the email security platform 112 that is running in the second computing infrastructure 104.

Figure 3:
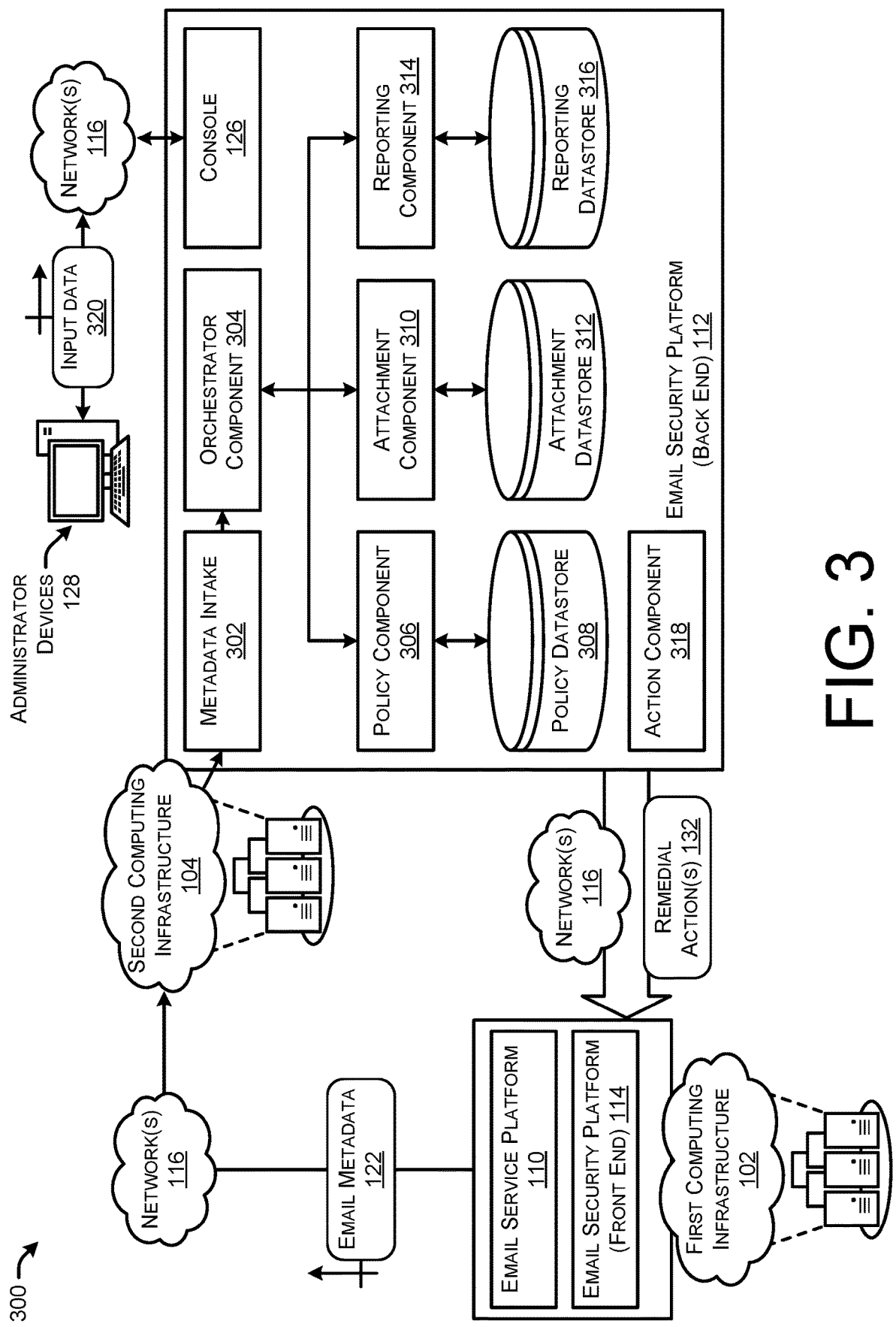
FIG. 3 illustrates a system-architecture diagram of components of a second computing architecture that is hosting an email security platform and is included a distributed computing architecture.

As described in more detail in FIG. 3, the email security platform 112 may perform security analysis on the email metadata 122 using, among other techniques, security policies 124 defined for the email security platform 112. The security policies may be defined or created by the email security platform 112 to detect potentially malicious emails, and/or be defined and/or created by administrators or other users of the email security platform 112. The email security platform 112 may analyze the email metadata 122 with reference to the security policies 124 to determine whether or not the email metadata 122 violates one or more security policies 124 that indicate the respective email 120 is potentially malicious.

The email security platform 112 may further provide a console 126 that may serve as an access point for administrator devices 128 to view information regarding the emails 120 communicated by user devices 118. The console 126 may comprise any type of access means, such as one or more of web APIs, dashboards, user interfaces, terminal servers, and/or any other means by which an administrator device 128 may obtain or access information associated with emails 120. As described in more detail in FIG. 4, an administrator device 128 may be able to use administrator credentials to access information such as the email metadata 122 for emails 120 communicated by users managed by entities operating the administrator devices 128, indications as to whether the emails 120 are potentially malicious, safe, unknown, and so forth. Further the console 126 may provide an email review interface 130 that, in addition to allowing the administrator devices 128 access this information, perform other operations such as searching or segmenting email information, and taking remedial actions with respect to an email 120 and/or a group of emails 120 communicated amongst user devices 118. Such remedial actions may include, but are not limited to, quarantining an email 120 or a group of emails 120, deleting an email 120 or a group of emails 120, flagging an email 120 or a group of emails 120 as questionable or unknown, marking an email 120 or a group of emails 120 as safe, and so forth.

In some instances, the administrator devices 128 may provide input indicating a remedial action 132 they would like to take with respect to an email 120 or a group of emails 120. In some instances, the email security platform 112 itself may be permitted to automatically determine and take remedial actions 132 to take on behalf of users. In one or both examples, the email security platform 112 may send indications of one or more remedial actions 132 for the email service platform 110 to take on one or more emails 120. The email service platform 110 may then take the remedial actions 132, and in some instances may report back results of those remedial actions 132 (e.g., success, failure, etc.).

Figure 2:
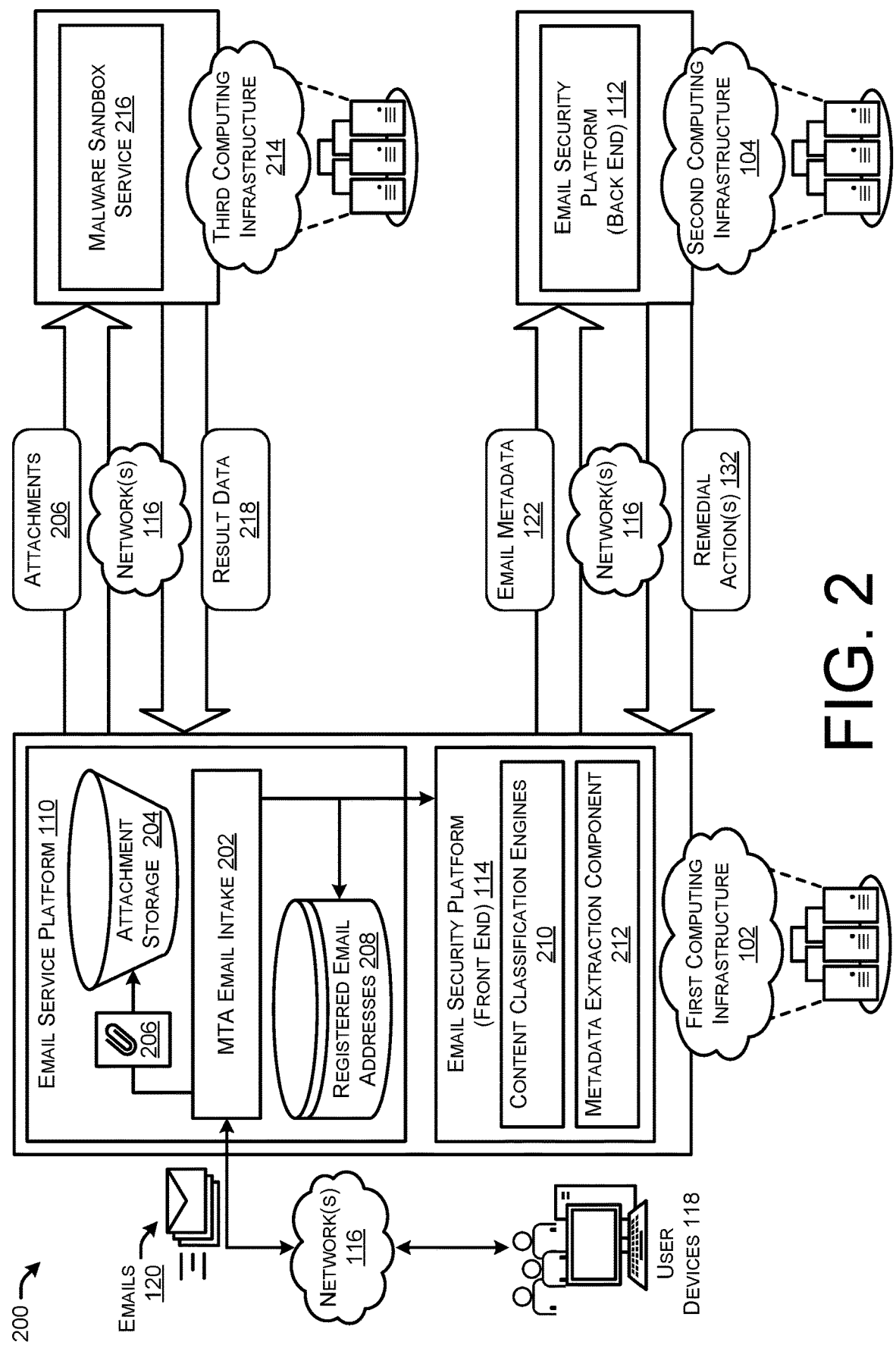
FIG. 2 illustrates a system-architecture diagram of components of a first computing architecture that is hosting an email service platform and is included a distributed computing architecture.

FIG. 2 illustrates a system-architecture diagram 200 of components of a first computing architecture 102 that is hosting an email service platform 110 and is included a distributed computing architecture.

As described above in FIG. 1, the email service platform 110 may generally provide a service to communicate emails 120 between user devices 118. Although not illustrated, the email service platform 110 may include various software and/or hardware components for provide an email service to users according to techniques known in the art. Further, the email service platform 110 may include a material transfer agreement (MTA) email intake 202 that receives the emails 120 communicated from user devices 118 that are to be sent to inboxes of destination email addresses associated with the email service platform 110. The email service platform 110 may journal the emails 120 to an intake MTA server (e.g., MTA email intake 202).

MTA email intake 202 may determine whether the emails 120 have attachments, and if they do, the MTA email intake 202 may take the attachments 206 and temporarily store them in a data store, such as attachment storage 204. Further, the MTA email intake 202 may compare one or more destination email addresses in the "To" portion of the emails 120 with registered email addresses 208 associated with the email security platform 112. The registered email addressed 208 may be stored in a queryable data structure, and may be email addresses that have been registered to have security analysis performed on emails 120 for those addresses by the email security platform 112. Upon determining that the destination email address(es) for an email 120 are registered email addresses 208, the MTA email intake 202 may forward the email 120 to the front end 114 for further analysis. If the destination email address(es) for an email 120 are not registered email addresses 208, then the email 120 will be dropped from further processing by the front end 114.

The front end 114 may receive the emails 120 using, for example, Remote Procedure Call (gRPC), and include one or more content classification engines 210 and a metadata extraction component 212. Generally, the content classification engines 210 may comprise any type of scanner or engine that examines the email 120, and classifies content of the email 120. The content classification engines 210 may work in conjunction with the metadata extraction component 212 in order to identify and extract the appropriate email metadata 122 from emails 120. For instance, the metadata extraction component 212 may extract, from emails 120, indications of the "To" email address(es), the "From" email address(es), the "Subject" of the emails 120, the Date/Time associated with communication of the emails 120, indications of universal resource locators (URLs) or other links in the emails 120, hashes of attachments, fuzzy hashes extracted from the message body of the emails 120, etc. Because the content classification engines 210 and metadata extraction component 212 are hosted in the first computing infrastructure 102, it may be permissible to allow the content classification engines 210 and metadata extraction component 212 to analyze private or sensitive portions of the emails 120 that the back end 112 is not permitted to analyze because the information will not leave the first computing infrastructure. For instance, the content classification engines 210 and metadata extraction component 212 may be permitted to scan the body of the emails 120 to identify URLs, but only the URLs are provided in the email metadata 122 may be provided to the email security platform 112. Thus, the front end 114 may scan or classify content of the emails 120 that is not being sent out of the first computing infrastructure 102 as email metadata 122, such as private content (e.g., subject of the emails 120, attachments to the emails 120, etc.).

After identifying and extracting the email metadata 122, the front end 114 may send the email metadata 122 to over the network(s) 116 to the email security platform 112 hosted on the second computing infrastructure 104. As discussed in FIG. 1, and more in FIG. 3, the second computing infrastructure 104 may determine remedial action(s) 132 to the first computing infrastructure 102.

In some instances, the first computing infrastructure 102 may further interact with a third computing infrastructure 214 that hosts a malware sandbox service 216. The malware sandbox service 216 may include devices, such as servers, that are isolated and configured to execute virtual machines to determine whether attachments 206 are malware. For instance, the malware sandbox service 216 may comprise virtual machines, or other execution environments, that reside in a protected and isolated third computing infrastructure 214. The attachments 206 may, in some instances, be sent from the temporary attachment storage 204 to the third computing infrastructure 214. The malware sandbox service 216 (E.g., Threat Grid from Cisco Systems, Inc.), may open and/or execute the attachments 206 to determine whether the attachments 206 contain or comprise malware. In some instances, the front end 114 may request that the email service platform 110 utilize the malware sandbox service 216 to test the attachments 206, and the malware sandbox service 216 may respond to the email service platform 110 with result data 218 indicating whether or not the attachments 206 are malware, and additional information around the attachments 206 (e.g., type of malware, results of malware, source of malware, etc.). The front end 114 may then in turn provide the result data 218 to the email security platform 112 running on the second computing infrastructure 104.

FIG. 3 illustrates a system-architecture diagram 300 of components of a second computing architecture 104 that is hosting an email security platform 112 and is included a distributed computing architecture.

As described above in FIGS. 1 and 2, the second computing infrastructure may receive email metadata 122 over network(s) 116, and may host an email security platform 112 to perform security analysis on the email metadata 122 for email communications 120. The email security platform 112 may include a metadata intake 302 that serves as a border system that accepts content, including the email metadata 122, over the network(s) 116. The metadata intake 302 may be a compute instance, and/or run as a virtual machine and/or container.

The metadata intake 302 may provide one or more queries to analyze emails to an orchestration component 304, which may comprise a function executing in the second computing infrastructure 104. The orchestration component 304 may distribute the queries for security analysis of the email metadata 122 to different system components of the email security platform 112. In some instances, the orchestration component 304 may interact with a policy component 206 in order to annotate the email metadata 122 with domain information such as a security policy obtained from a policy datastore 308. The policy component 306 may use a destination email address for the email metadata 122 to identify, from the policy datastore, one or more security policies to use for analyzing the email metadata 122.

The policy component 306 may then utilize the security policies for the email addresses associated with the email metadata 122 to analyze the email metadata 122 to determine if the corresponding email 120 is malicious. The policy component 306 may perform various types of security analysis techniques, such as determining whether one or more of the following:

"From," "To", "Cc," and/or "Bee" email addresses are associated with malicious email addresses or email domains;

"Subject" line content of the email metadata 122 is associated with malicious words, symbols, phrases, languages, etc.;

Dates and/or times at which one or a group of emails 120 (e.g., mass spam emails) indicate malicious emails;

IP addresses associated with a sender of the email(s) 120 are known malicious IP addresses or associated with malicious domains;

URLs are associated with malicious sites, domains, and/or other network-assessible destinations; and/or Fuzzy hashes of content of the email 120 is associated with malicious fuzzy hashes of content known to be malicious.

However, the above-noted list is merely exemplary, and other types of security policies may be used to analyze the email metadata 122. The policy component 306 may then generate result data indicating a result of the security analysis of the email metadata 122 using the security policy(ies) stored in the policy datastore 308.

Further, the orchestration component 304 may call an attachment component 310 that has access to an attachment datastore 312. Generally, the attachment datastore 312 may store or otherwise indicate the result data 218 received from the malware sandbox service 216. For instance, the attachment datastore 312 may indicate whether or not attachments 206 to the email 120 are malicious, suspicious, and/or safe. Further, the attachment datastore 312 may indicate additional information associated with malicious attachments 206, such as indications of a type of malicious activity associated with the attachment 206 (e.g., a type of malware), a source of the malware, etc.

The orchestrator component may obtain result data from the policy component 306, and/or from the attachment component 310, and provide the result data to a reporting component 314 to be stored in a reporting datastore 316. Thus, the reporting datastore 316 may indicate information around whether the email metadata 122 is associated with a malicious email 120. The reporting component 314 may interact with the console 126 described in FIG. 1 in order to provide administrator devices 128 with access to view data stored in the reporting datastore 316, and/or provide input data 320 indicating actions to be taken for one or more emails 120. As described in FIG. 1, the administrator devices 128 may indicate one or more remedial actions 132 to be taken with respect to the email(s) 120. The email security platform 112 may include an action component 318 that dispatches indications of the remedial action(s) 132 to the first computing infrastructure 102 that causes the email service platform 110 to take the remedial action(s) 132.

Figure 4:
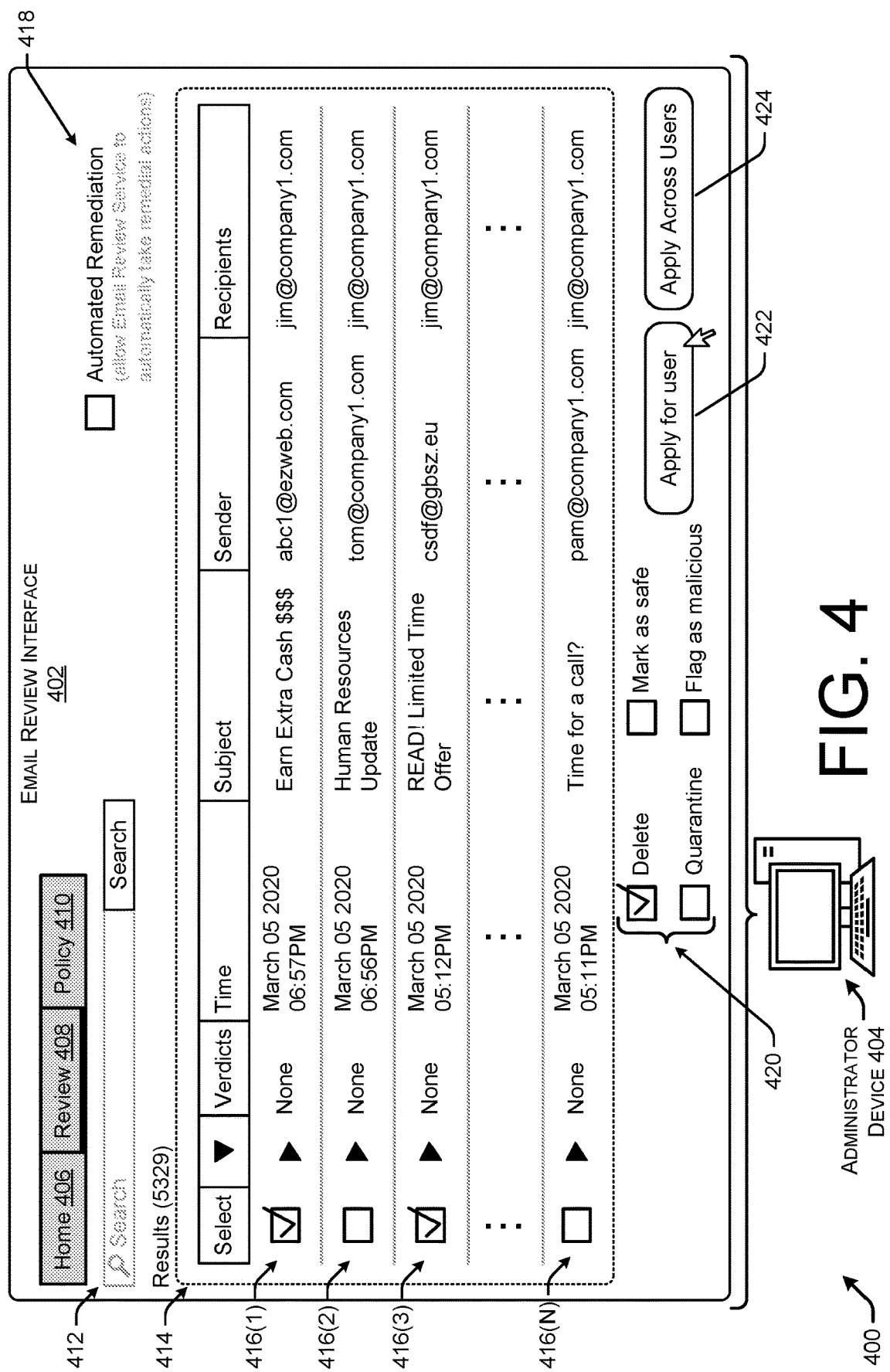
FIG. 4 illustrates an example user interface provided by an email security platform through which an administrator is able to review and take remedial actions on potentially malicious emails.

FIG. 4 illustrates an environment 400 including an example email review interface 402 provided by an email security platform 112 through which an administrator device 404 is able to review and take remedial actions on potentially malicious emails.

The email review interface 402 generally represents data associated with an email 120 that has been analyzed by an email security platform 112, and allows an administrator using an administrator device 404 to take actions with respect to email metadata 122 and emails 120. The email review interface 402 may include a home tab 406, a review tab 408, and a policy tab 410. The policy tab 410 may allow the administrator device 404 with the ability to add, modify, and/or view a security policy associated with user accounts that are managed by the administrator. For instance, an administrator using the administrator device 404 may be an IT employee of an organization, an owner of an organization, and so forth, and may manage groups or domains of email addresses that are registered for use of the email security platform 112.

The administrator device 404 may select the review tab 408 to view and/or interact with email metadata 122 associated with one or more emails 120 via the email review interface 402. The administrator device 404 may be presented with a search option 412 through which the administrator may search the reporting datastore 316 based on emails 120, any of the email metadata 122, any malicious indications for emails 120, and/or any other data accessible by the email security platform 112.

After performing a search, a results interface 414 may be presented which indicates, in this example, listing 416 of emails 120 and associated email metadata 122. As shown, multiple listings 416(1)-416(N) may be presented (where "N" is any integer greater than "1"). The listings 416 may include various information about an email 120, such as a verdict, a time associated with the email 120, a subject of the email 120, sender(s) of the email 120, and/or recipient(s) of the email 120. The administrator may view the various metadata 122, and may further be presented with a select option for each listing 416 of for a corresponding email 120. The administrator device 404 may be utilized to provide input data 320 indicating a selection of one or more listings 416, along with a selection of an operation selection 420. The operation selections 420 may include, for example, a delete operation 420, a quarantine operation 420, a mark-as-safe operation 420, and/or a flag-as-malicious operation 420. After selecting one or more of the operation selections 420, the administrator device 404 may provide further input indicating that they would like to apply the selection operations 420 for each selection listing 416 for a single user 422, and/or across all users 424 of a grouping of users (e.g., users in a domain space, users belonging to an organization, etc.). Further, in some examples, the operation selections 420 may be different operations, additional operations, less operations, and/or any combination thereof.

The remedial actions 132 indicated by the administrator device 404 may then be provided to the console 126, which passes the remedial actions 132 to the action component 318, which then in turn transmits indications of the remedial action(s) 132 to be taken to the first computing infrastructure to be performed by the email service platform 110.

In some examples, the email review interface 402 may include an automated-remediation option 418. The administrator may select the automated-remediation option 418 in order to enable the email security platform 112 to automatically determine and take remedial actions 132 by sending the instructions to take the remedial actions 132 to the email service platform. That is, upon determining that the results of the security analysis on the email metadata 122 and/or other information associated with the email 120 indicate that the email is malicious, the email security platform may determine an appropriate remedial action 132 and automatically instruct the email service platform 110 to perform the appropriate remedial action(s) 132.

It should be appreciated that the email review interface 402 is merely illustrative and exemplary, and any other type of interface or interfaces may be utilized by a user and/or administrator to view, access, and provide actions to be taken with respect to emails 120 whose email metadata 122 has been analyzed by an email security platform 112.

Figure 5:
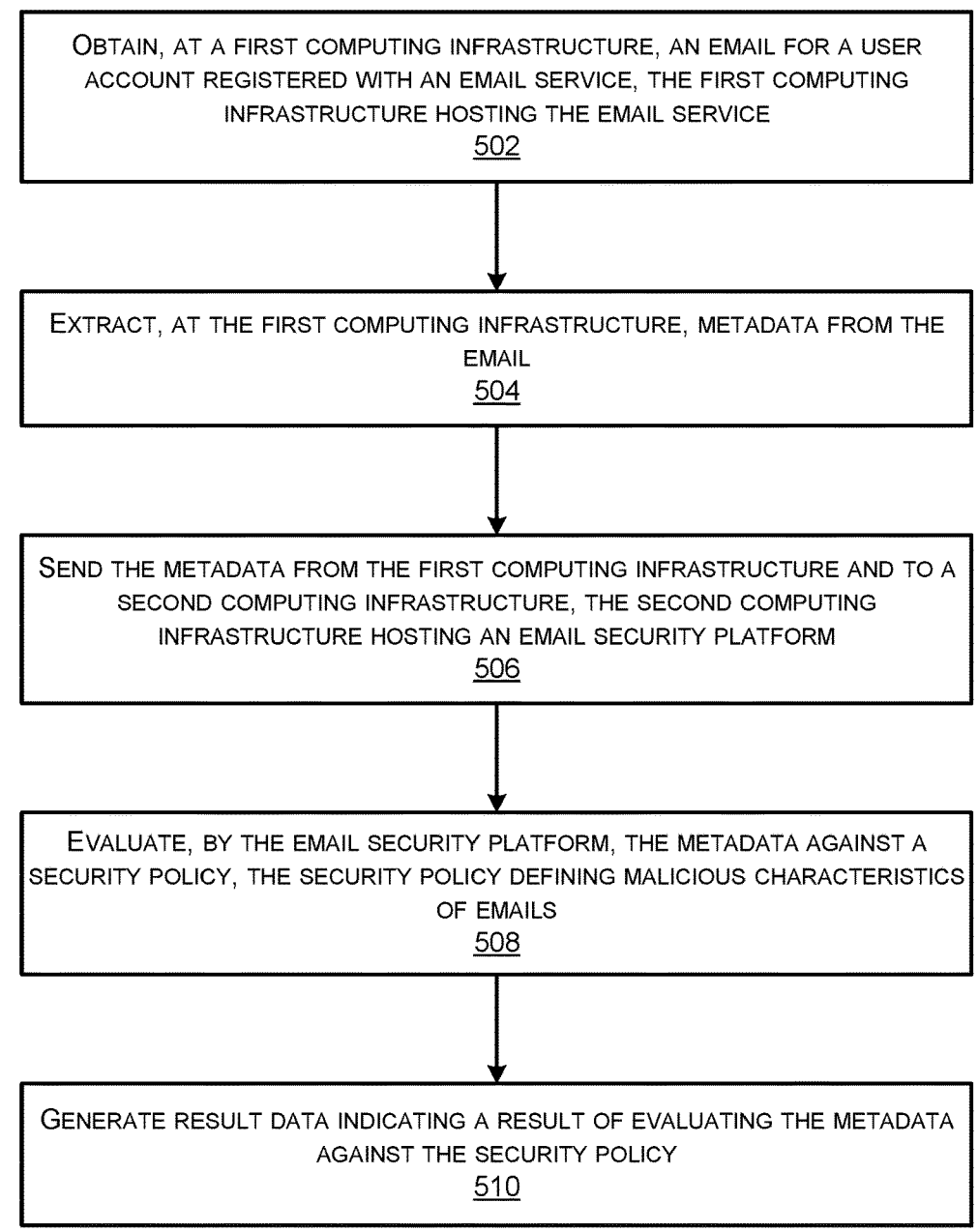
FIG. 5 illustrates a flow diagram of an example method for implementing an email security platform across multiple computing infrastructures, and minimizing data flow between the computing infrastructures to implement the email security platforms.

FIG. 5 illustrates a flow diagram of an example method 500 that illustrates aspects of the functions performed at least partly by the devices in the computing infrastructures as described in FIGS. 1-4. The logical operations described herein with respect to FIG. 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, and/or different components.

FIG. 5 illustrates a flow diagram of an example method for implementing an email security platform across multiple computing infrastructures, and minimizing data flow between the computing infrastructures to implement the email security platforms. The techniques may be applied by a system comprising one or more processors, and one or more non-transitory computer-readable media storing computer-executable instructions that, when executed by the one or more processors, cause the one or more processors to perform operations of method 500.

At 502, a first computing infrastructure may obtain an email for a user account registered with an email service. For instance, a front end 114 operating on a first computing infrastructure 102 may obtain an email 120 for a user account (e.g., email account) registered with an email service platform 110 that is hosted on the first computing infrastructure 102. The front end 114 may obtain the email 120 from the email service platform 110.

At 504, a component may extract, at a first computing infrastructure 102 may extract metadata from the email. For instance, a metadata extraction component 212 of the front end 114 may extract email metadata 122 from the email 120. The email metadata 122 may include one or more of a first email address the from which the email was sent, a second email address to which the email was sent, a subject of the email, a date on which the email was sent, a Uniform Resource Locator (URL) included in the email, a hash of an attachment to the email, and/or a fuzzy hash extracted from a body of the email.

At 506, the front end 114 may send the metadata from the first computing infrastructure and to a second computing infrastructure where the second computing infrastructure hosting an email security platform. For instance, the front end 114 may send the email metadata 122 from the first computing infrastructure 102, over one or more networks 116, and to the second computing infrastructure 102 that is hosting the email security platform 112.

At 508, the email security platform may evaluate the metadata against a security policy, the security policy defining malicious characteristics of emails. For instance, the email security platform 112 may evaluate the email metadata 122 against a security policy stored in the policy datastore 308, and the security policy may be associated with the user account (e.g., or a grouping of user accounts).

At 510, the email security platform 112 may generate result data indicating a result of evaluating the metadata against the security policy. In some instances, the result data may further include an indication of whether an attachment 206 is malicious as indicated in the attachment datastore 312.

In some instances, the result data may indicate that the email 120 is malicious. In such instances, the method 500 may further include receiving, at the second computing infrastructure 104 and via the email security platform 112, input from an administrator account associated with the user account indicating a request to delete or quarantine the email 120, and sending, from the second computing infrastructure 104, an instruction to the first computing infrastructure 102 to delete or quarantine the email 120 from an inbox associated with the user account.

In some instances, the method 500 may further comprise refraining from sending content of a body of the email 120 to the second computing infrastructure 104.

In some instances, the method 500 may further comprise storing an attachment 206 to the email in an attachment data store 204 of the first computing infrastructure 102, sending, by the email security platform front end 114, an instruction to a malware detection service 216 to analyze the attachment 206, the malware detection service being hosted on a third computing infrastructure 214, and receiving, at the email security platform 112, second result data 218 indicating a second result of an analysis of the attachment 206 by the malware detection service 216.

In some instances, the method 500 may further comprise determining that the result data indicates that the email 120 is malicious, and based at least in part on the email being malicious, automatically sending an instruction from the second computing infrastructure and to the first computing infrastructure to delete or quarantine the email from an inbox associated with the user account.

Figure 6:
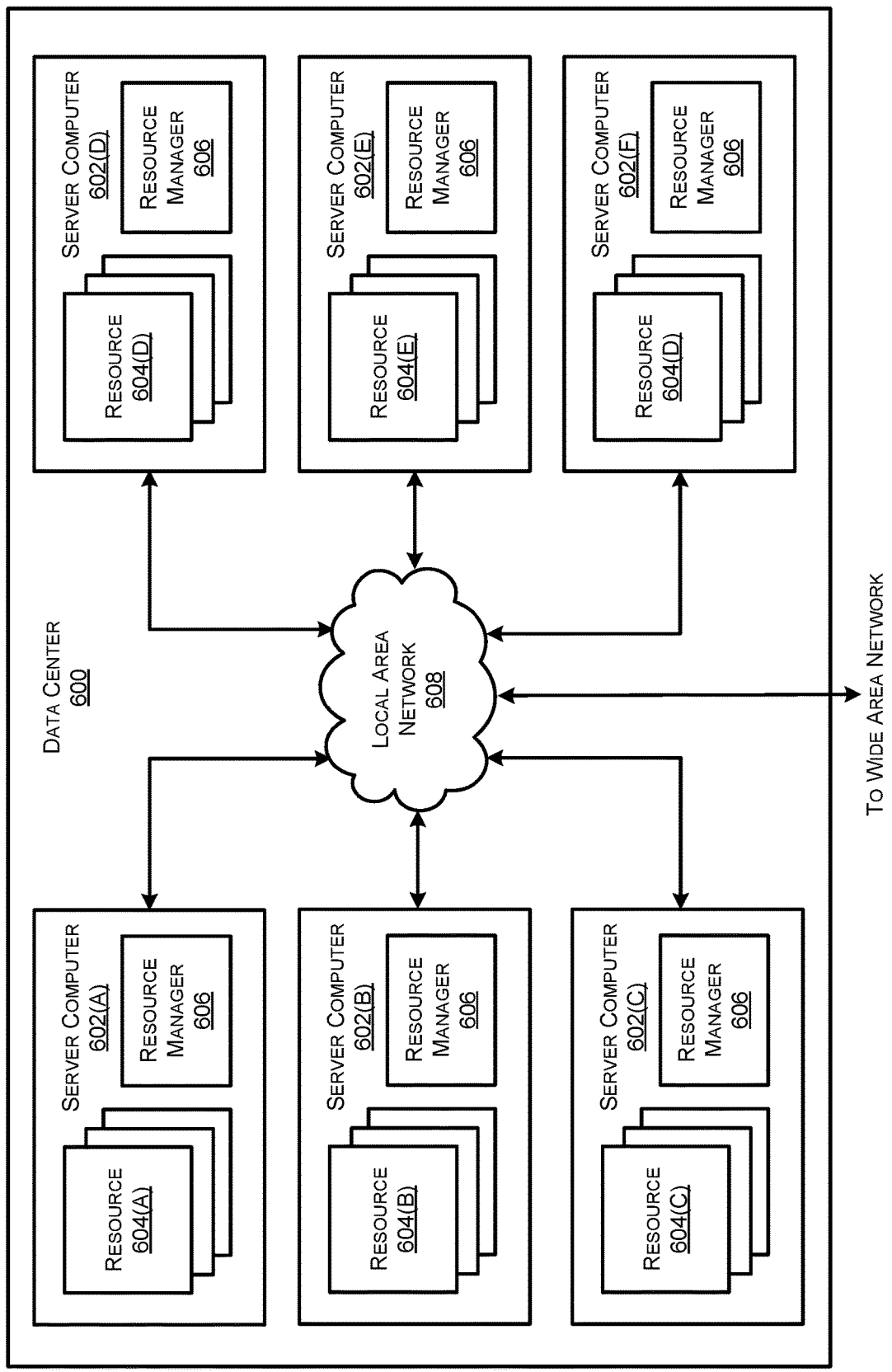
FIG. 6 illustrates a computing system diagram illustrating a configuration for a data center that can be utilized to implement aspects of the technologies disclosed herein.

FIG. 6 is a computing system diagram illustrating a configuration for a data center 600 that can be utilized to implement aspects of the technologies disclosed herein. The example data center 600 shown in FIG. 6 includes several server computers 602A-602F (which might be referred to herein singularly as "a server computer 602" or in the plural as "the server computers 602") for providing computing resources. In some examples, the resources and/or server computers 602 may include, or correspond to, the any type of networked device described herein. Although described as servers, the server computers 602 may comprise any type of networked device, such as servers, switches, routers, hubs, bridges, gateways, modems, repeaters, access points, etc.

The server computers 602 can be standard tower, rack-mount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, and others. Some of the servers 602 can also be configured to execute a resource manager 606 capable of instantiating and/or managing the computing resources. In the case of VM instances, for example, the resource manager 606 can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602F in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more application containers and/or virtual machines to perform techniques described herein.

In some instances, the data center 600 may provide computing resources, like application containers, VM instances, and storage, on a permanent or an as-needed basis. Among other types of functionality, the computing resources provided by a cloud computing network may be utilized to implement the various services and techniques described above. The computing resources 604 provided by the cloud computing network can include various types of computing resources, such as data processing resources like application containers and VM instances, data storage resources, networking resources, data communication resources, network services, and the like.

Each type of computing resource 604 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 604 not mentioned specifically herein.

The computing resources 604 provided by a cloud computing network may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 7.

Figure 7:
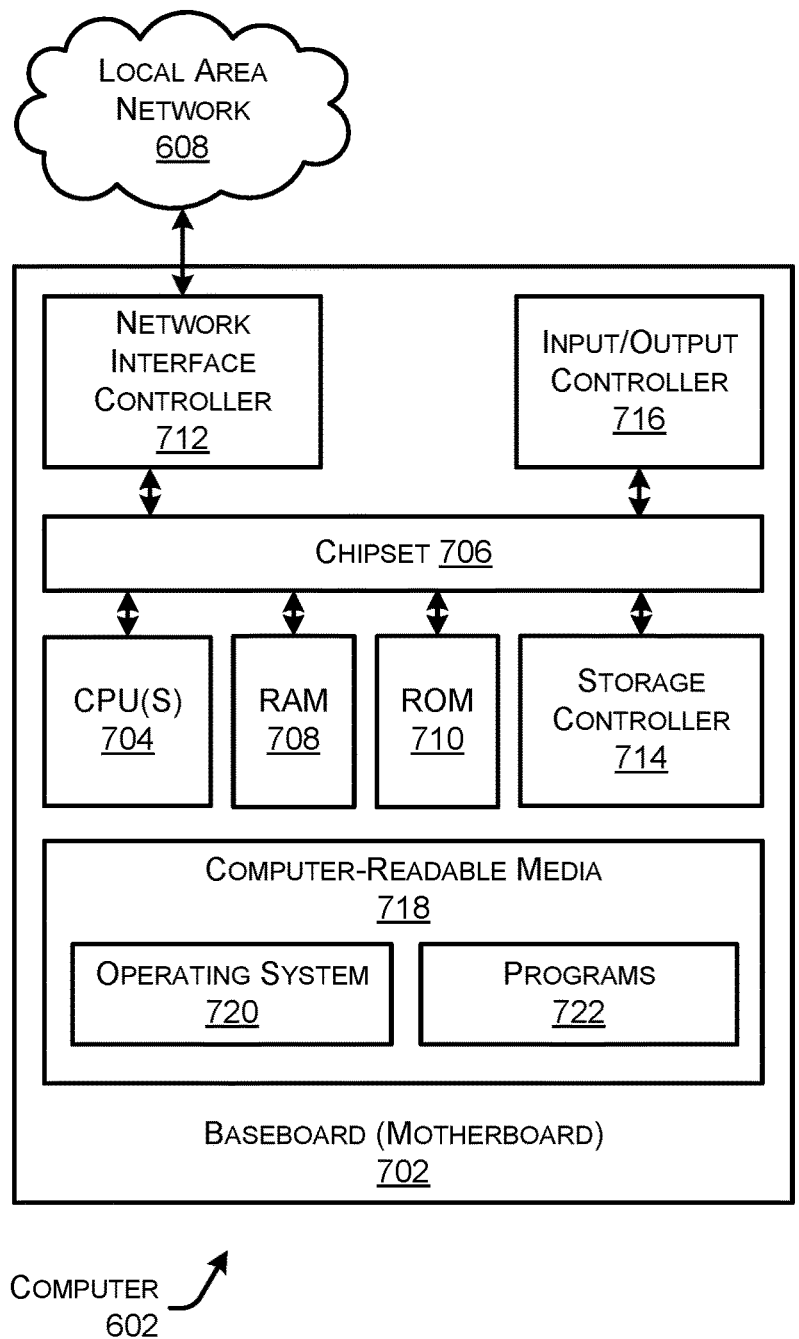
FIG. 7 is a computer architecture diagram showing an illustrative computer hardware architecture for implementing a computing device that can be utilized to implement aspects of the various technologies presented herein.

FIG. 7 shows an example computer architecture for a server computer 602 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The server computer 602 may, in some examples, correspond to a physical server 106 described herein, and may comprise networked devices such as servers, switches, routers, hubs, bridges, gateways, modems, repeaters, access points, etc.

The computer 602 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 602.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 602. The chipset 706 can further provide an interface to a computer-readable storage medium such as a read-only memory ("ROM") 710 or non-volatile RAM ("NVRAM") for storing basic routines that help to startup the computer 602 and to transfer information between the various components and devices. The ROM 710 or NVRAM can also store other software components necessary for the operation of the computer 602 in accordance with the configurations described herein.

The computer 602 can operate in a networked environment using logical connections to remote computing devices and computer systems through a network, such as the network 608. The chipset 706 can include functionality for providing network connectivity through a NIC 712, such as a gigabit Ethernet adapter. The NIC 712 is capable of connecting the computer 602 to other computing devices over the network 608. It should be appreciated that multiple NICs 712 can be present in the computer 602, connecting the computer to other types of networks and remote computer systems.

The computer 602 can be connected to a storage device 718 that provides non-volatile storage for the computer. The storage device 718 can store an operating system 720, programs 722, and data, which have been described in greater detail herein. The storage device 718 can be connected to the computer 602 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 602 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 602 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 602 can further read information from the storage device 718 by detecting the physical states or characteristics of one or more particular locations within the physical storage units.

In addition to the mass storage device 718 described above, the computer 602 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 602. In some examples, the operations performed by devices in the distributed application architecture 102, and or any components included therein, may be supported by one or more devices similar to computer 602. Stated otherwise, some or all of the operations performed by the distributed application architecture 102, and or any components included therein, may be performed by one or more computer devices 602 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 602. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 718 can store other system or application programs and data utilized by the computer 602.

In one embodiment, the storage device 718 or other computer-readable storage media is encoded with computer-executable instructions which, when loaded into the computer 602, transform the computer from a general-purpose computing system into a special-purpose computer capable of implementing the embodiments described herein. These computer-executable instructions transform the computer 602 by specifying how the CPUs 704 transition between states, as described above. According to one embodiment, the computer 602 has access to computer-readable storage media storing computer-executable instructions which, when executed by the computer 602, perform the various processes described above with regard to FIGS. 1-5. The computer 602 can also include computer-readable storage media having instructions stored thereupon for performing any of the other computer-implemented operations described herein.

The computer 602 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 602 might not include all of the components shown in FIG. 7, can include other components that are not explicitly shown in FIG. 7, or might utilize an architecture completely different than that shown in FIG. 7.

The computer 602 may generally comprise any type of computing device that may implement techniques described herein, and/or be included in a system of devices for implementing the techniques described herein (e.g., one or more devices in the first computing infrastructure 102, one or more devices in the second computing infrastructure 104, and/or any combination thereof or any devices/systems/infrastructures described herein).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a first cloud computing infrastructure that is managed by a first service provider and from a user device, an email for a user account registered with an email service, the first cloud computing infrastructure hosting the email service at a first physical location;

extracting, at the first cloud computing infrastructure, metadata from the email, the metadata comprising at least an email address from which the email was sent;

sending the metadata from the first cloud computing infrastructure and to a second cloud computing infrastructure that is managed by a second service provider, the second cloud computing infrastructure being different from the first cloud computing infrastructure and hosting an email security platform at a second physical location that is different from the first physical location;

evaluating, by the email security platform, the metadata against a security policy, the security policy defining malicious characteristics of emails;
generating, at the second cloud computing infrastructure, result data indicating a result of evaluating the metadata against the security policy;
storing, by the email security platform, the result data in a data store of the second cloud computing infrastructure;
providing an administrator account with access to a console for interacting with the email security platform;
receiving, via the console, a request from the administrator account to access the result data; and
providing the administrator account with access to the result data.

2. The method of claim 1, wherein the metadata further comprises one or more of:
a second email address to which the email was sent;
a subject of the email;
a date on which the email was sent;
a Uniform Resource Locator (URL) included in the email;
a hash of an attachment to the email; or
a fuzzy hash extracted from a body of the email.

3. The method of claim 1, further comprising refraining from sending content of a body of the email to the second cloud computing infrastructure.

4. The method of claim 1, wherein the result data indicates that the email is malicious, further comprising:
receiving, at the second cloud computing infrastructure and via the email security platform, input from the administrator account associated with the user account indicating a request to delete or quarantine the email; and
sending, from the second cloud computing infrastructure, an instruction to the first cloud computing infrastructure to delete or quarantine the email from an inbox associated with the user account.

5. The method of claim 1, further comprising:
storing an attachment to the email in an attachment data store of the first cloud computing infrastructure;
sending, by the email security platform, an instruction to a malware detection service to analyze the attachment, the malware detection service being hosted on a third computing infrastructure; and
receiving, at the email security platform, second result data indicating a second result of an analysis of the attachment by the malware detection service.

6. The method of claim 1, further comprising:
determining that the result data indicates that the email is malicious; and
based at least in part on the email being malicious, automatically sending an instruction from the second cloud computing infrastructure and to the first cloud computing infrastructure to delete or quarantine the email from an inbox associated with the user account.

7. The method of claim 1, wherein the metadata is sent from the first cloud computing infrastructure and to the second cloud computing infrastructure over a publicly accessible network.

8. The method of claim 1, wherein the result data comprises an indication that the metadata comprises malicious information and additional information associated with the malicious information.

9. A system comprising:
one or more processors; and
one or more non-transitory computer-readable media storing computer-executable instructions that, when executed by the one or more processors, cause the one or more processors to perform operations comprising:
receiving, at a first cloud computing infrastructure that is managed by a first service provider and from a user device, an email for a user account registered with an email service, the first cloud computing infrastructure hosting the email service at a first physical location;
determining to have an email security platform hosted at a second cloud computing infrastructure evaluate the email using a security policy, wherein the first cloud computing infrastructure and the second cloud computing infrastructure communicate over a publicly accessible network;
identifying, from the email, metadata that is non-sensitive such that the metadata that is non-sensitive is permitted to leave the first cloud computing infrastructure, be communicated over the publicly accessible network, and provided to the second cloud computing infrastructure;
based at least in part on the metadata being non-sensitive such that the metadata that is non-sensitive is permitted to be communicated over the publicly accessible network, extracting, at the first cloud computing infrastructure, the metadata from the email, the metadata comprising an email address from which the email was sent;
sending the metadata from the first cloud computing infrastructure and to the second cloud computing infrastructure that is managed by a second service provider, the second cloud computing infrastructure being different from the first cloud computing infrastructure at a second physical location that is different from the first physical location;
evaluating, by the email security platform, the metadata against the security policy, the security policy defining malicious characteristics of emails; and
generating, at the second cloud computing infrastructure, result data indicating a result of evaluating the metadata against the security policy.

10. The system of claim 9, wherein the metadata further comprises one or more of:
a second email address to which the email was sent;
a subject of the email;
a date on which the email was sent;
a Uniform Resource Locator (URL) included in the email;
a hash of an attachment to the email; or
a fuzzy hash extracted from a body of the email.

11. The system of claim 9, the operations further comprising refraining from sending content of a body of the email to the second cloud computing infrastructure.

12. The system of claim 9, wherein the result data indicates that the email is malicious, the operations further comprising:
receiving, at the second cloud computing infrastructure and via the email security platform, input from an administrator account associated with the user account indicating a request to delete or quarantine the email; and
sending, from the second cloud computing infrastructure, an instruction to the first cloud computing infrastructure to delete or quarantine the email from an inbox associated with the user account.

13. The system of claim 9, the operations further comprising:
storing an attachment to the email in an attachment data store of the first cloud computing infrastructure;

sending, by the email security platform, an instruction to a malware detection service to analyze the attachment, the malware detection service being hosted on a third computing infrastructure; and receiving, at the email security platform, second result data indicating a second result of an analysis of the attachment by the malware detection service.

14. The system of claim 9, the operations further comprising:

storing, by the email security platform, the result data in a data store of the second cloud computing infrastructure;

providing an administrator account with access to a console for interacting with the email security platform;

receiving, via the console, a request from the administrator account to access the result data, wherein the administrator account is associated with an administrator device; and providing the administrator account with access to the result data.

15. The system of claim 9, the operations further comprising:

determining that the result data indicates that the email is malicious; and based at least in part on the email being malicious, automatically sending an instruction from the second cloud computing infrastructure and to the first cloud computing infrastructure to delete or quarantine the email from an inbox associated with the user account.

16. One or more non-transitory computer-readable media storing computer-executable instructions that, when executed by one or more processors, cause the one or more processors to perform operations comprising:

receiving, at a first cloud computing infrastructure managed by a first service provider and from a user device, an email for a user account registered with an email service, the first cloud computing infrastructure hosting the email service at a first physical location;

extracting, at the first cloud computing infrastructure, metadata from the email, the metadata comprising an email address from which the email was sent;

sending the metadata from the first cloud computing infrastructure and to a second cloud computing infrastructure that is managed by a second service provider, the second cloud computing infrastructure being different from the first cloud computing infrastructure and hosting an email security platform at a second physical location that is different from the first physical location;

evaluating, by the email security platform, the metadata against a security policy, the security policy defining malicious characteristics of emails;

generating, at the second cloud computing infrastructure, result data indicating a result of evaluating the metadata against the security policy;

storing, by the email security platform, the result data in a data store of the second cloud computing infrastructure; and providing an administrator account with access to a console for interacting with the email security platform.

17. The one or more non-transitory computer-readable media of claim 16, wherein the metadata further comprises one or more of:

a second email address to which the email was sent;
a subject of the email;
a date on which the email was sent;
a Uniform Resource Locator (URL) included in the email;
a hash of an attachment to the email; or
a fuzzy hash extracted from a body of the email.

18. The one or more non-transitory computer-readable media of claim 16, the operations further comprising refraining from sending content of a body of the email to the second cloud computing infrastructure.

19. The one or more non-transitory computer-readable media of claim 16, wherein the result data indicates that the email is malicious, the operations further comprising:

receiving, at the second cloud computing infrastructure and via the email security platform, input from the administrator account associated with the user account indicating a request to delete or quarantine the email; and sending, from the second cloud computing infrastructure, an instruction to the first cloud computing infrastructure to delete or quarantine the email from an inbox associated with the user account.

20. The one or more non-transitory computer-readable media of claim 16, the operations further comprising:

receiving, via the console, a request from the administrator account to access the result data, wherein the administrator account is associated with an administrator device; and providing the administrator account with access to the result data.

\* \* \* \* \*